(12) United States Patent
Shiramatsu (10) Patent No.: US 12,539,599 B2
(45) Date of Patent: Feb. 3, 2026

(54) ROBOT

(71) Applicant: FANUC CORPORATION, Yamanashi (JP)

(72) Inventor: Daisuke Shiramatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/728,198

(22) PCT Filed: Feb. 24, 2022

(86) PCT No.: PCT/JP2022/007543
§ 371 (c)(1),
(2) Date: Jul. 11, 2024

(87) PCT Pub. No.: WO2023/162078
PCT Pub. Date: Aug. 31, 2023

(65) Prior Publication Data
US 2025/0108501 A1  Apr. 3, 2025

(51) Int. Cl.
*B25J 9/00* (2006.01)
*B25J 9/04* (2006.01)
*B25J 19/00* (2006.01)

(52) U.S. Cl.
CPC ............. *B25J 9/0009* (2013.01); *B25J 9/046* (2013.01); *B25J 19/0083* (2013.01)

(58) Field of Classification Search
CPC ...... B25J 9/0009; B25J 9/046; B25J 19/0075; B25J 9/0018
See application file for complete search history.

(56) References Cited

FOREIGN PATENT DOCUMENTS

| | | |
|---|---|---|
| JP | H09234688 A | 9/1997 |
| JP | 2009107116 A | 5/2009 |
| JP | 2011125946 A | 6/2011 |
| JP | 2021003784 A | 1/2021 |
| WO | 2014087615 A1 | 6/2014 |
| WO | WO-2021005968 A1 * | 1/2021 .......... B25J 19/0025 |

OTHER PUBLICATIONS

Machine translation of WO-2021005968-A1. (Year: 2021).*

* cited by examiner

*Primary Examiner* — Randell J Krug
(74) *Attorney, Agent, or Firm* — Maier & Maier, PLLC (57) ABSTRACT

A robot includes a base installed on an installation surface, a movable part rotatable around a vertical axis relative to the base, and a support mechanism that supports the movable part so as to be rotatable around the axis relative to the base, where the movable part has an inner surface extending circumferentially at the periphery of the support mechanism and facing the base, and an opening connecting an inner space across which the inner surface and the base face each other with an outer space at a specific position in the circumferential direction, and the inner surface slopes in the direction away from the base towards the opening.

5 Claims, 7 Drawing Sheets

ROBOT

TECHNICAL FIELD

The present invention relates to robots.

BACKGROUND

A robot in the related art that is used in a clean environment or in a cleaning booth employs a structure that makes a joint gap, serving as a connection point between joints that move relatively to each other, as narrow as possible to reduce the entry of dust or liquid into the joint gap (e.g., see PCT International Publication No. WO 2014/087615).

SUMMARY

An aspect of the present invention is a robot including: a base installed on an installation surface; a movable part rotatable around a vertical axis relative to the base; and a support mechanism that supports the movable part in such a manner as to be rotatable around the axis relative to the base. The movable part includes an inner surface extending in a circumferential direction around the support mechanism and facing the base, and an opening that allows an inner space and an outer space to communicate with each other at a specific position in the circumferential direction. The inner space is where the inner surface and the base face each other. The inner surface is sloped toward the opening in a direction extending away from the base.

DETAILED DESCRIPTION OF EMBODIMENTS

A robot 1 according to an embodiment of the present invention will be described below with reference to the drawings.

Figure 1:
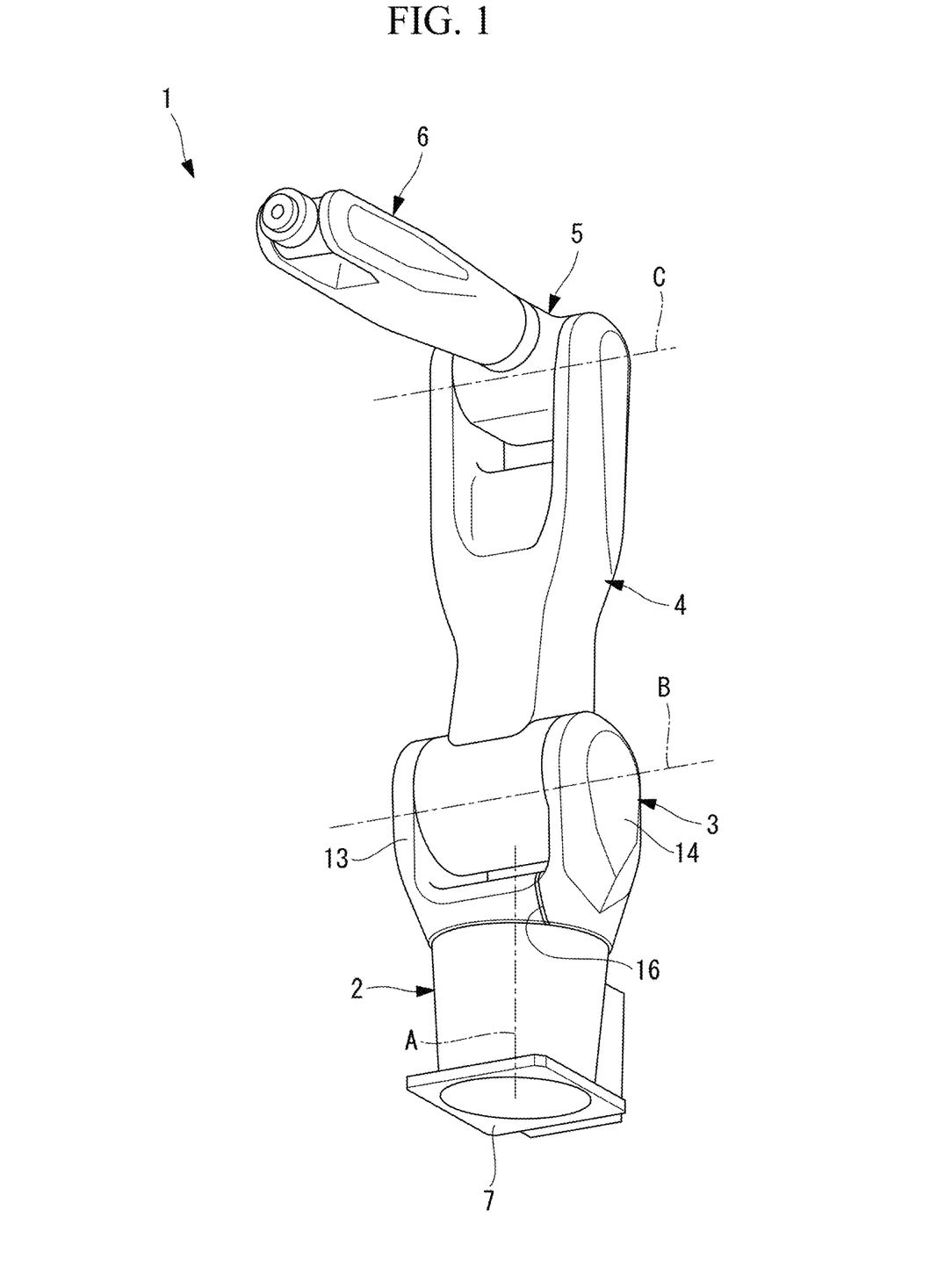
FIG. 1 is a perspective view illustrating a robot according to an embodiment of the present invention.

For example, as shown in FIG. 1, the robot 1 according to this embodiment is a vertical six-axis articulated robot and includes a J1 base (base) 2 to be installed on an installation surface and a J2 base (movable part) 3 supported by the J1 base 2 in such a manner as to be rotatable around a first vertical axis (axis) A.

Furthermore, the robot 1 according to this embodiment includes a first arm 4 supported in such a manner as to be rotatable relative to the J2 base 3 around a second axis B orthogonal to a plane including the first axis A, and also includes a second arm 5 supported in such a manner as to be rotatable relative to the first arm 4 around a third axis C parallel to the second axis B. A three-axis wrist unit 6 is disposed at the distal end of the second arm 5.

Figure 2:
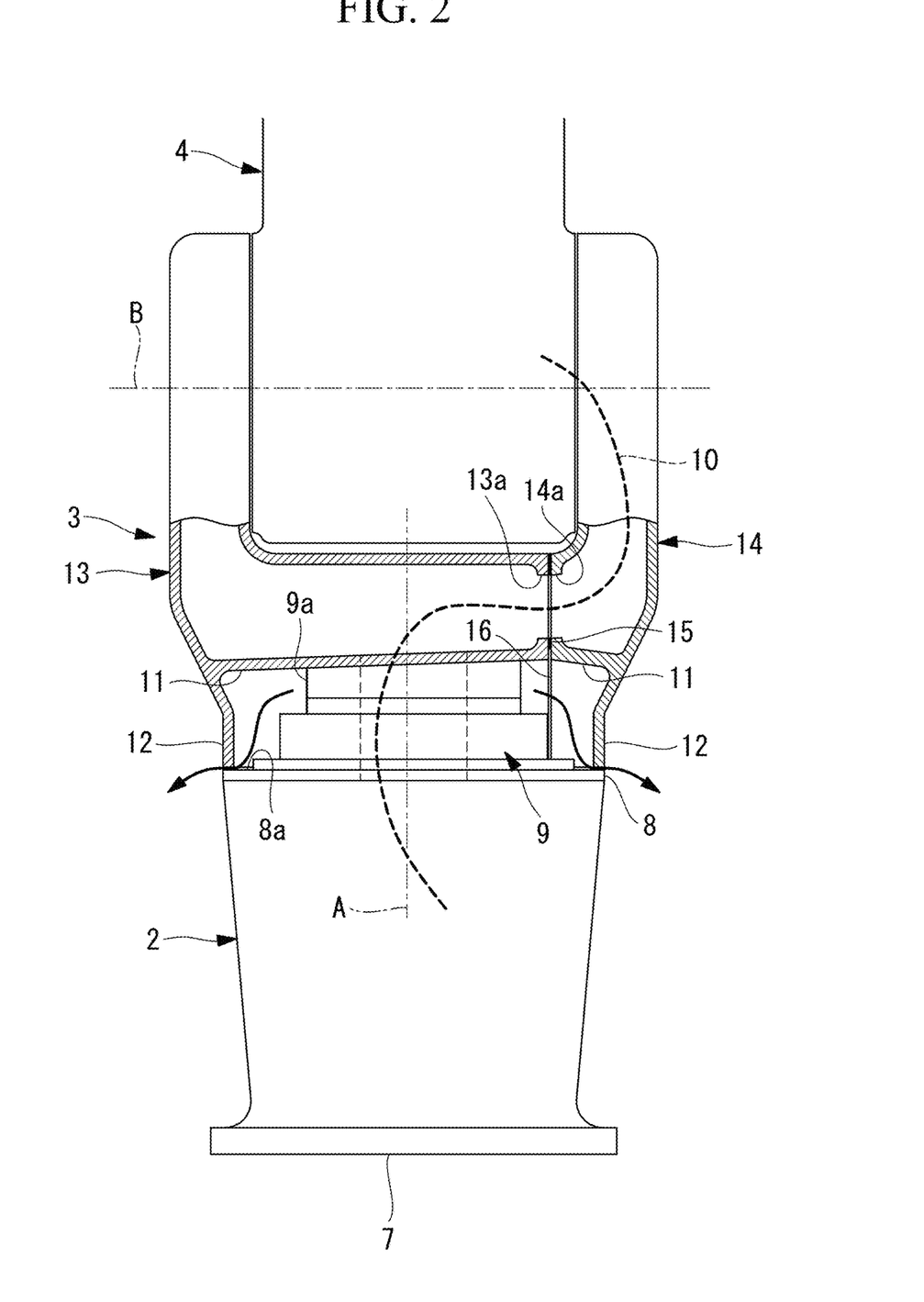
FIG. 2 is a partial vertical sectional view illustrating a connection section between a J1 base and a J2 base of the robot in FIG. 1.

As shown in FIG. 2, the J1 base 2 has a shape of a box having a mounting surface 7 to be installed on the installation surface and a connection section 8 disposed a distance away from the mounting surface 7 in the direction of the first axis A. At the connection section 8 of the J1 base 2, the J2 base 3 is supported by a speed reducer (support mechanism) 9 in such a manner as to be rotatable around the first axis A.

The connection section 8 has an annular surface 8a extending radially outward of the speed reducer 9 along the entire perimeter thereof. The annular surface 8a is sloped radially outward from an outer peripheral position of the speed reducer 9 in a direction extending toward the mounting surface 7, that is, in a direction extending away from the J2 base 3. The speed reducer 9 is hollow and has a linear object 10, such as a cable, extending therethrough from the inside of the J1 base 2 to the inside of the J2 base 3 via a cavity located near the first axis A and extending along the first axis A.

The J2 base 3 includes an annular inner surface 11 located radially outward of the speed reducer 9 and facing the annular surface 8a of the connection section 8 of the J1 base 2 with a distance therefrom in the direction of the first axis A, and also includes a tubular outer peripheral wall 12 extending in the direction of the first axis A from the outer peripheral edge of the annular inner surface 11 toward the J1 base 2. The J2 base 3 includes a first housing (housing) 13 fixed to an output member 9a of the speed reducer 9, and also includes a second housing (housing) 14 combined with the first housing.

Figure 3:
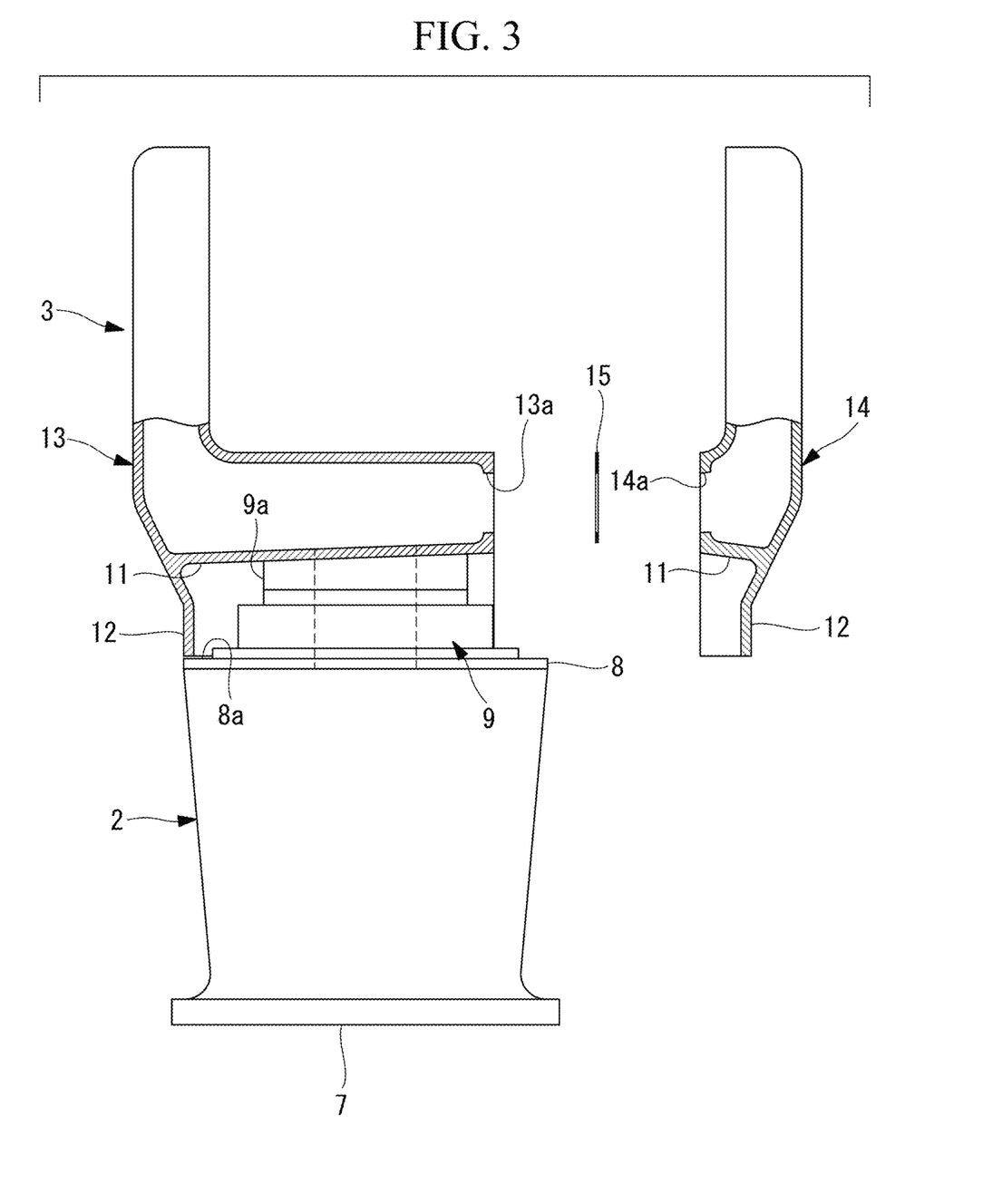
FIG. 3 is a partially exploded vertical sectional view illustrating a first housing, a second housing, and a gasket that constitute the J2 base in FIG. 2.
Figure 4:
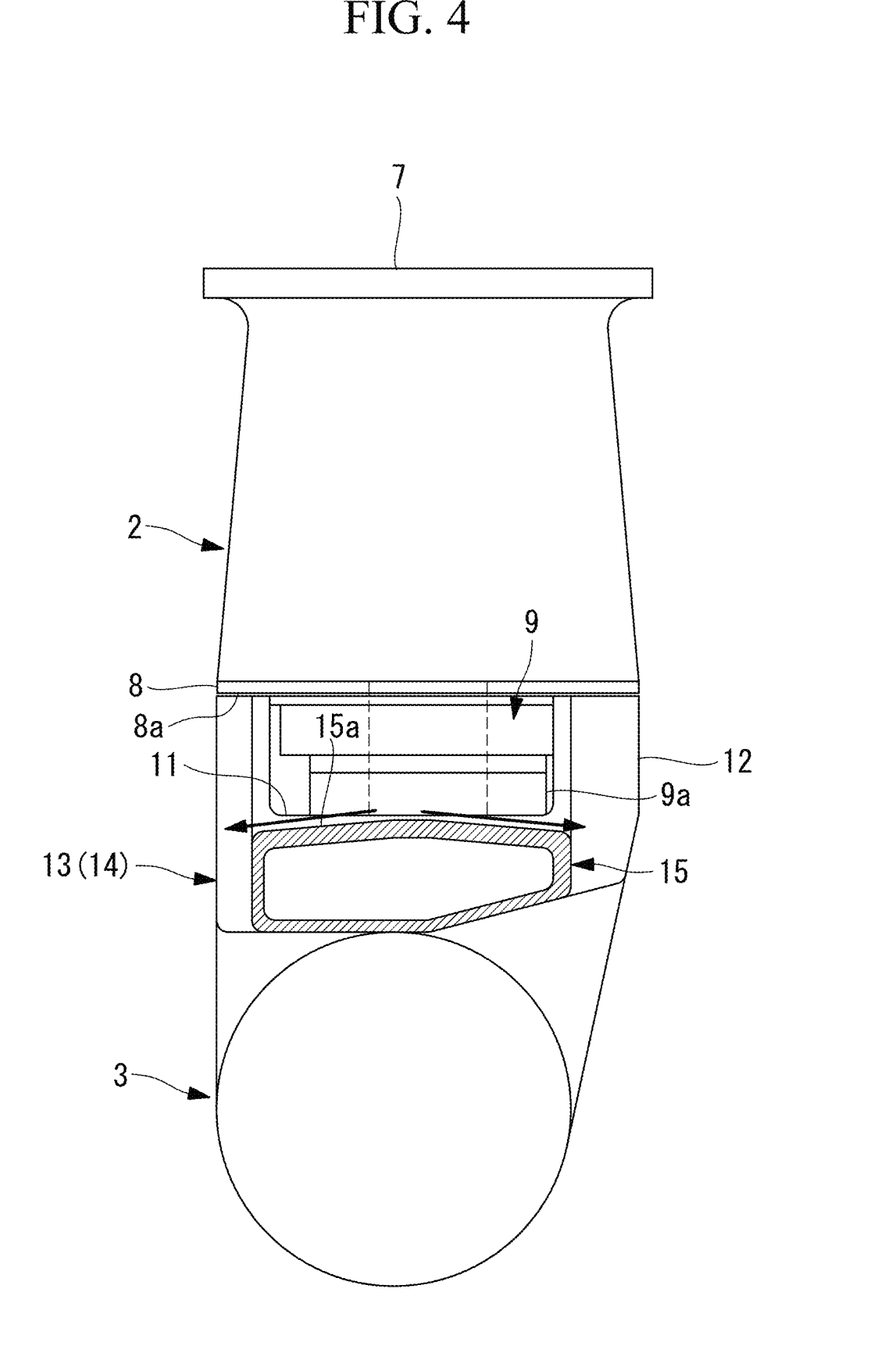
FIG. 4 is a side view illustrating the gasket disposed at a coupling surface between the first housing and the second housing of the J2 base in FIG. 2.

As shown in FIGS. 3 and 4, the first housing 13 and the second housing 14 are hollow, and end surfaces thereof having openings 13a and 14a are coupled to each other with a gasket 15, which surrounds the openings 13a and 14a, interposed therebetween. Accordingly, the first housing 13 and the second housing 14 are integrally combined with each other in a state where the openings 13a and 14a are hermetically sealed from the outside. The linear object 10 routed through the first housing 13 from the J1 base 2 via the cavity in the speed reducer 9 can be guided into the second housing 14 via the openings 13a and 14a, and can further be guided into the first arm 4.

The first housing 13 and the second housing 14 are partially provided with the inner surface 11 and the outer peripheral wall 12 of the J2 base 3. By combining the first housing 13 and the second housing 14 with each other, the annular inner surface 11 and the tubular outer peripheral wall 12 are formed along the entire perimeter.

Figure 6:
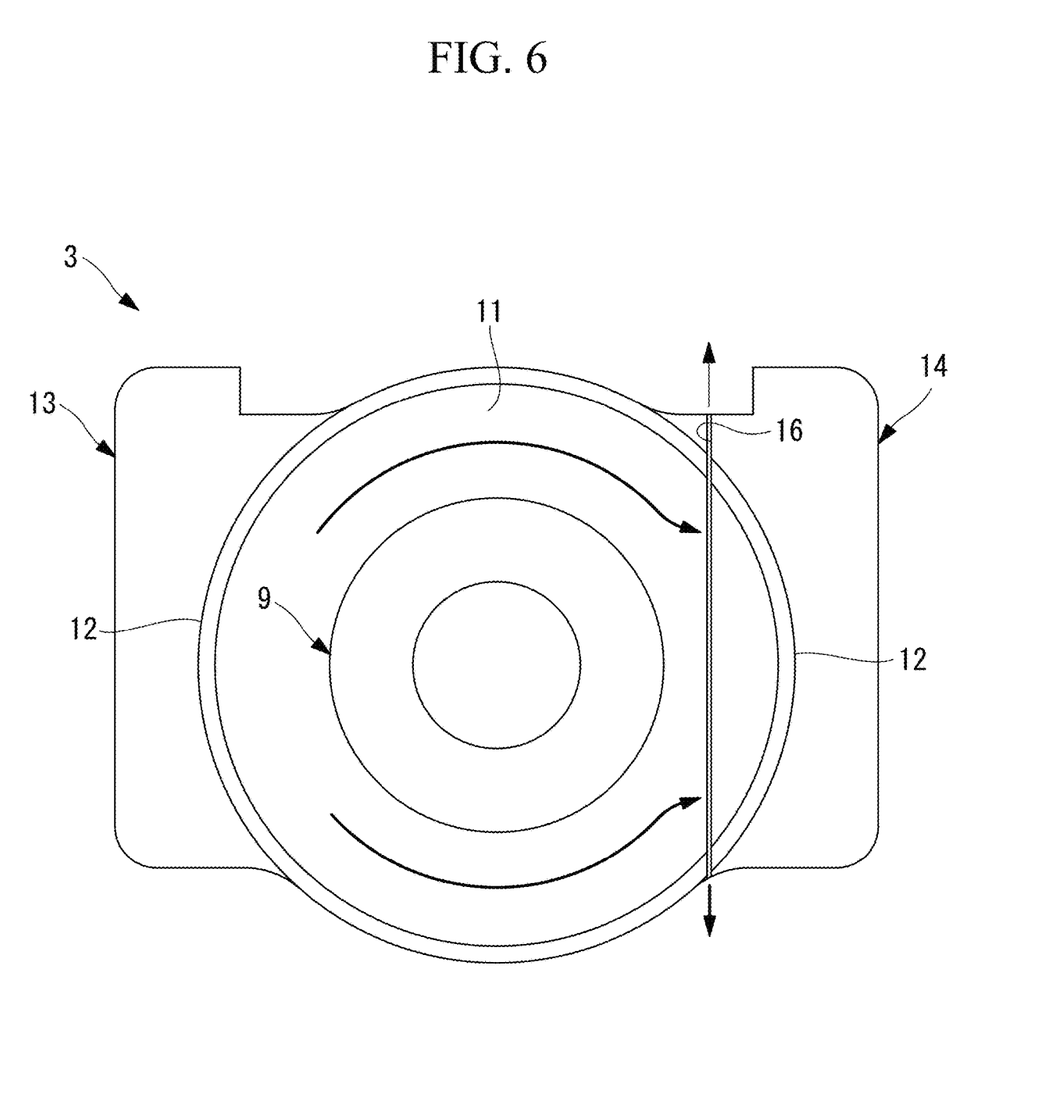
FIG. 6 illustrates the flow of the liquid at an inner surface of the first housing of the J2 base in FIG. 5.

Since the gasket 15 is interposed between the first housing 13 and the second housing 14, the inner surface 11 and the outer peripheral wall 12 are provided with slits 16 corresponding to the thickness of the gasket 15 at two locations, as shown in FIG. 2. Therefore, as shown in FIG. 6, the slits 16 form openings that connect a donut-shaped inner space, surrounded by the surface of the connection section 8 of the J1 base 2 and by the inner surface 11 and the outer peripheral wall 12 of the J2 base 3, to an outer space of the robot 1, as shown in FIG. 6.

As shown in FIG. 2, the inner surface 11 of the J2 base 3 is sloped toward the slits 16 in a direction extending away from the J1 base 2. As shown in FIG. 4, the gasket 15 has an edge 15a that faces the aforementioned donut-shaped inner space and that is sloped from the center between the two slits 16 toward each slit 16 in a direction extending away from the J1 base 2 along the first axis A.

The operation of the robot 1 according to this embodiment having the above-described configuration will be described below.

As shown in FIGS. 1 and 2, with regard to the robot 1 according to this embodiment, when the mounting surface 7 of the J1 base 2 is installed (in a floor-standing fashion) on the installation surface, such as a horizontal floor surface, the annular surface 8*a* of the connection section 8 of the J1 base 2 is disposed facing upward, whereas the inner surface 11 of the J2 base 3 is disposed facing downward.

The outer peripheral wall 12 of the J2 base 3 serves as an apron extending vertically downward from the outer peripheral edge of the inner surface 11 along the entire perimeter, and suppresses entry of dust and liquid falling from above into the donut-shaped inner space inside the outer peripheral wall. Since a gap is formed between the lower end of the outer peripheral wall 12 and the annular surface 8*a* of the connection section 8 of the J1 base 2, some of the dust and liquid enter the donut-shaped inner space through the gap.

Because the upward-facing annular surface 8*a* of the connection section 8 is sloped radially outward from the outer periphery of the speed reducer 9 in the direction extending toward the mounting surface 7, that is, in the downward direction, the liquid entering the donut-shaped inner space is released to the outer space along the annular surface 8*a*, as shown in FIG. 2. Accordingly, for example, it is possible to prevent the liquid that causes a metallic component to corrode from accumulating in the inner space.

The following description relates to a case where the robot 1 according to this embodiment operates in a so-called ceiling-suspended installed fashion where the mounting surface 7 of the J1 base 2 is installed on the installation surface, such as a horizontal ceiling surface.

In this case, in contrast to the above description, the annular surface 8*a* of the connection section 8 of the J1 base 2 is disposed facing downward, whereas the inner surface 11 of the J2 base 3 is disposed facing upward. The outer peripheral wall 12 of the J2 base 3 extends vertically upward from the outer peripheral edge of the inner surface 11 along the entire perimeter, so as to surround the donut-shaped inner space. Since a gap is formed between the upper end of the outer peripheral wall 12 and the annular surface 8*a* of the connection section 8 of the J1 base 2, dust and liquid enter the inner space through this gap.

Figure 5:
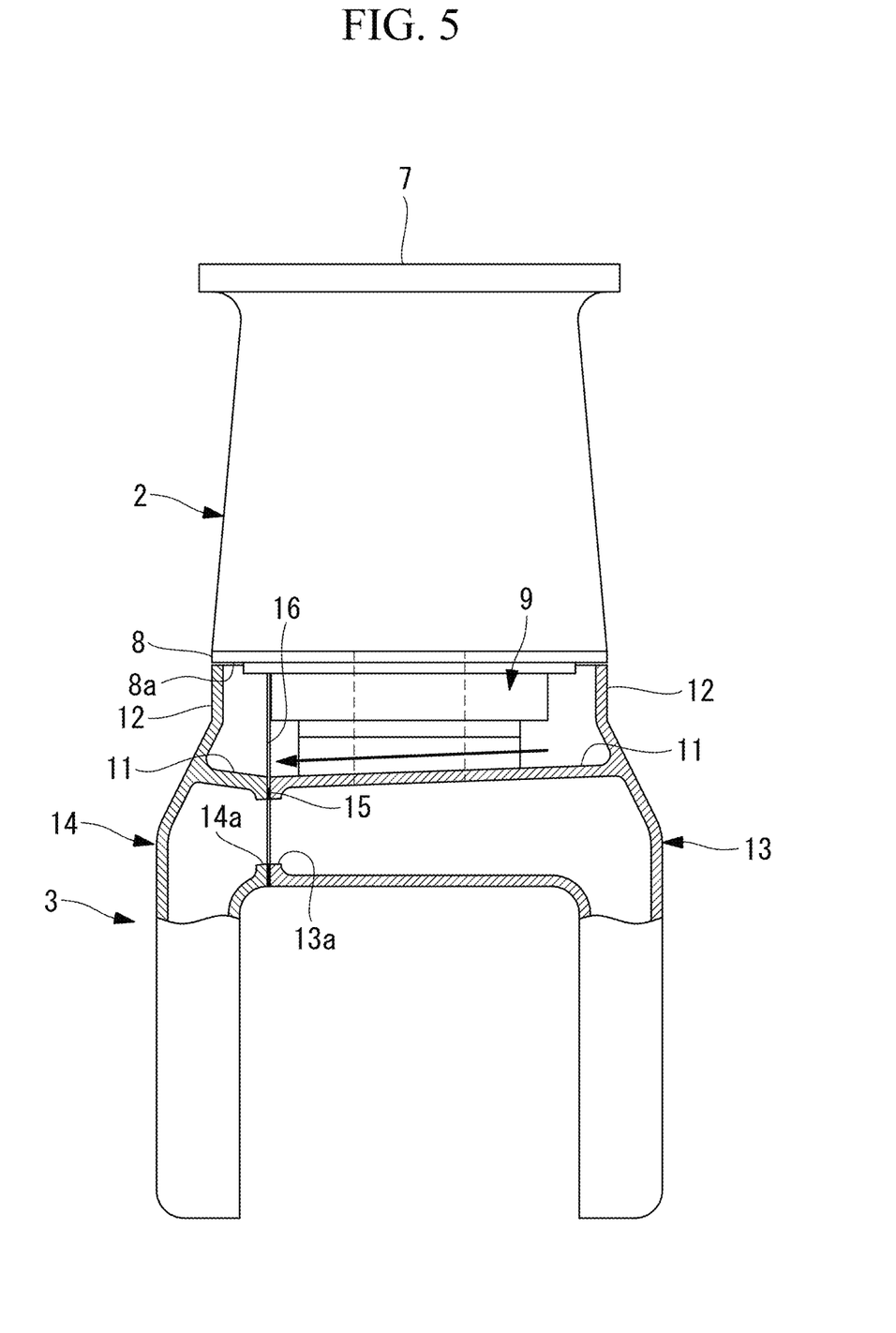
FIG. 5 is a partial vertical sectional view illustrating the flow of a liquid in an inner space when the robot in FIG. 1 is installed in a ceiling-suspended fashion.

In this case, because the upward-facing inner surface 11 of the J2 base 3 is sloped, the liquid entering the donut-shaped inner space flows along the slope of the inner surface 11 and flows out to the outer space of the robot 1 through the slits 16 disposed downstream, as shown in FIGS. 5 and 6. Furthermore, since the upper edge (edge) 15*a* of the gasket 15 provided with the slits 16 is sloped downward from the center between the two slits 16 in the outer peripheral wall 12 toward each slit 16, as shown in FIG. 4, the liquid flowing along the inner surface 11 and entering each slit 16 is discharged to the outer space of the robot 1 along the slope of the upper edge 15*a* of the gasket 15.

Therefore, in the case of the ceiling-suspended installation, it is similarly possible to prevent the liquid from accumulating in the inner space.

Specifically, in both the floor-standing installation and the ceiling-suspended installation that are switched therebetween in accordance with a user's request, the robot 1 according to this embodiment is advantageous in being capable of preventing the liquid from accumulating in the inner space. Since the liquid is discharged by utilizing openings having a relatively small width, specifically, the slits 16 corresponding to the thickness of the gasket 15, the liquid can be discharged from the inner space, while entry of the liquid into the inner space from the outer space via the openings can be suppressed.

Figure 7:
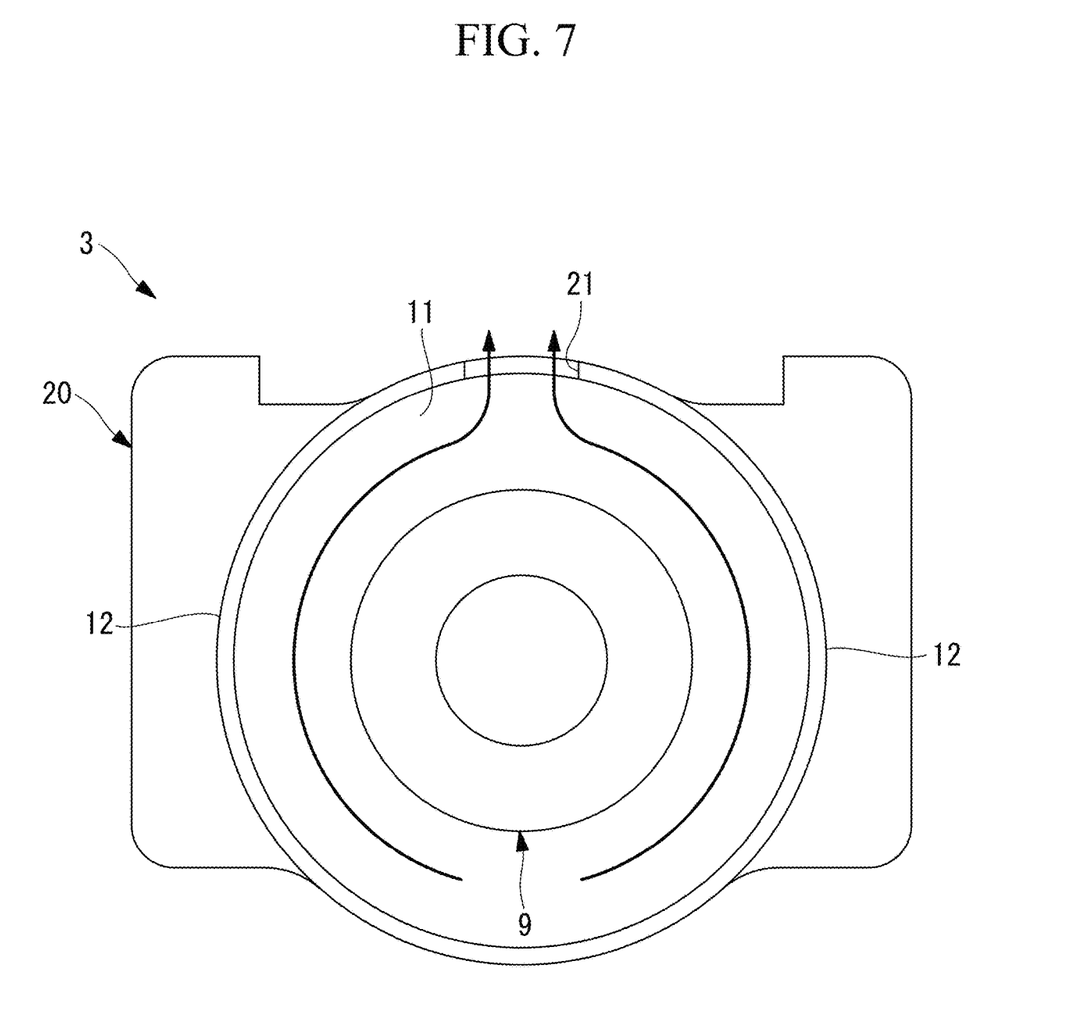
FIG. 7 illustrates a modification of FIG. 6.

In this embodiment, the slits 16 corresponding to the thickness of the gasket 15 and provided between the first housing 13 and the second housing 14 that are combined with each other with the gasket 15 interposed therebetween serve as liquid-discharging openings. Alternatively, if a housing 20 is integrally formed such that the slits 16 are not provided, for example, a component-assembly opening 21 may be used, as shown in FIG. 7. The opening 21, which is functionally required, may be used as a liquid-discharging opening, and the inner surface 11 may be sloped toward the opening 21.

In this embodiment, the outer peripheral wall 12 surrounding the donut-shaped inner space is provided, and the outer peripheral wall 12 is provided with the openings that allow the outer space and the inner space to communicate with each other. Alternatively, the outer peripheral wall 12 does not have to be provided, and the openings may be in, for example, the inner surface 11 other than the outer peripheral wall 12.

The invention claimed is:

1. A robot comprising:
a base installed on an installation surface;
a movable part rotatable around a vertical axis relative to the base; and
a support mechanism that supports the movable part in such a manner as to be rotatable around the axis relative to the base,
wherein the movable part comprises an inner surface extending in a circumferential direction around the support mechanism and facing the base and an opening that allows an inner space and an outer space to communicate with each other at a specific position in the circumferential direction, the inner space being where the inner surface and the base face each other,
wherein the inner surface is sloped toward the opening in a direction extending away from the base,
wherein the base has an annular surface that extends in the circumferential direction around the support mechanism and that faces the movable part, and
wherein the annular surface is sloped radially outward in a direction extending away from the movable part.

2. The robot according to claim 1,
wherein the movable part comprises a tubular outer peripheral wall disposed at an outer peripheral edge of the inner surface and extending in a direction of the axis toward the base, and
wherein the outer peripheral wall is provided with the opening.

3. The robot according to claim 2, wherein the opening is a slit extending in a height direction of the outer peripheral wall.

4. The robot according to claim 3,
wherein the movable part comprises two housings detachably combined with each other with a gasket interposed therebetween,
wherein each housing comprises one part of the outer peripheral wall in the circumferential direction, and
wherein the slit comprises slits provided at two locations by outer peripheral walls of the two housings separated from each other by a thickness of the gasket.

5. The robot according to claim 4, wherein the gasket has an edge that faces the inner space and that is sloped from a center between the two slits toward each slit in the direction extending away from the base along the axis.

* * * * *